United States Patent
Cuccias

[19]

[11] Patent Number: 6,074,722
[45] Date of Patent: Jun. 13, 2000

[54] FLEXIBLE MATERIAL FOR USE IN AN INFLATABLE STRUCTURE

[75] Inventor: Robert S. Cuccias, Woodland Hills, Calif.

[73] Assignee: Lockheed Martin Corporation, Palmdale, Calif.

[21] Appl. No.: 08/799,635

[22] Filed: Feb. 12, 1997

Related U.S. Application Data

[63] Continuation of application No. 08/545,051, Oct. 12, 1995, abandoned, which is a continuation-in-part of application No. 08/315,531, Sep. 30, 1994, abandoned.

[51] Int. Cl.$^7$ ........................................................ B32B 5/12
[52] U.S. Cl. .................. 428/107; 428/113; 428/110; 442/286; 442/287; 442/288; 244/31
[58] Field of Search .............................. 244/31; 428/107, 428/113, 110; 442/286, 287, 288

[56] References Cited

U.S. PATENT DOCUMENTS

| | | | |
|---|---|---|---|
| 3,127,135 | 3/1964 | Burr et al. | |
| 4,770,918 | 9/1983 | Hayashi | 428/113 |
| 4,871,598 | 10/1989 | Potente et al. | 428/36.1 |
| 5,118,558 | 6/1992 | Mater et al. | 428/252 |
| 5,198,280 | 3/1993 | Harpell et al. | 428/102 |
| 5,215,795 | 6/1993 | Matsumoto et al. | 428/36.1 |
| 5,275,434 | 1/1994 | Hirabayashi | 280/743 R |

FOREIGN PATENT DOCUMENTS 3702936   1/1987   Germany.

*Primary Examiner*—Marion E. McCamish
*Assistant Examiner*—Elizabeth M. Cole
*Attorney, Agent, or Firm*—Robert A. Schruhl

[57] ABSTRACT

The invention is a material suitable for use as the wall of a pressurized container such as the gas bag of a lighter-than-air vehicle. In detail the invention includes a first flexible ply having filamentary material comprising unidirectional filamentary material at 0 and 90 degrees to each other. A second flexible layer is included having unidirectional filamentary material at 0 and 90 degrees to each other and at 45 degrees to the filamentary material of the first ply. The strain value at failure for the filamentary material of the second ply is greater than the 0 and 90 degree filamentary material of the first layer. The first and second plies are bonded together by a resin. Preferably, additional a film of gas impermeable material and a ultra violet radiation resistant material are bonded to the first two plies.

10 Claims, 5 Drawing Sheets

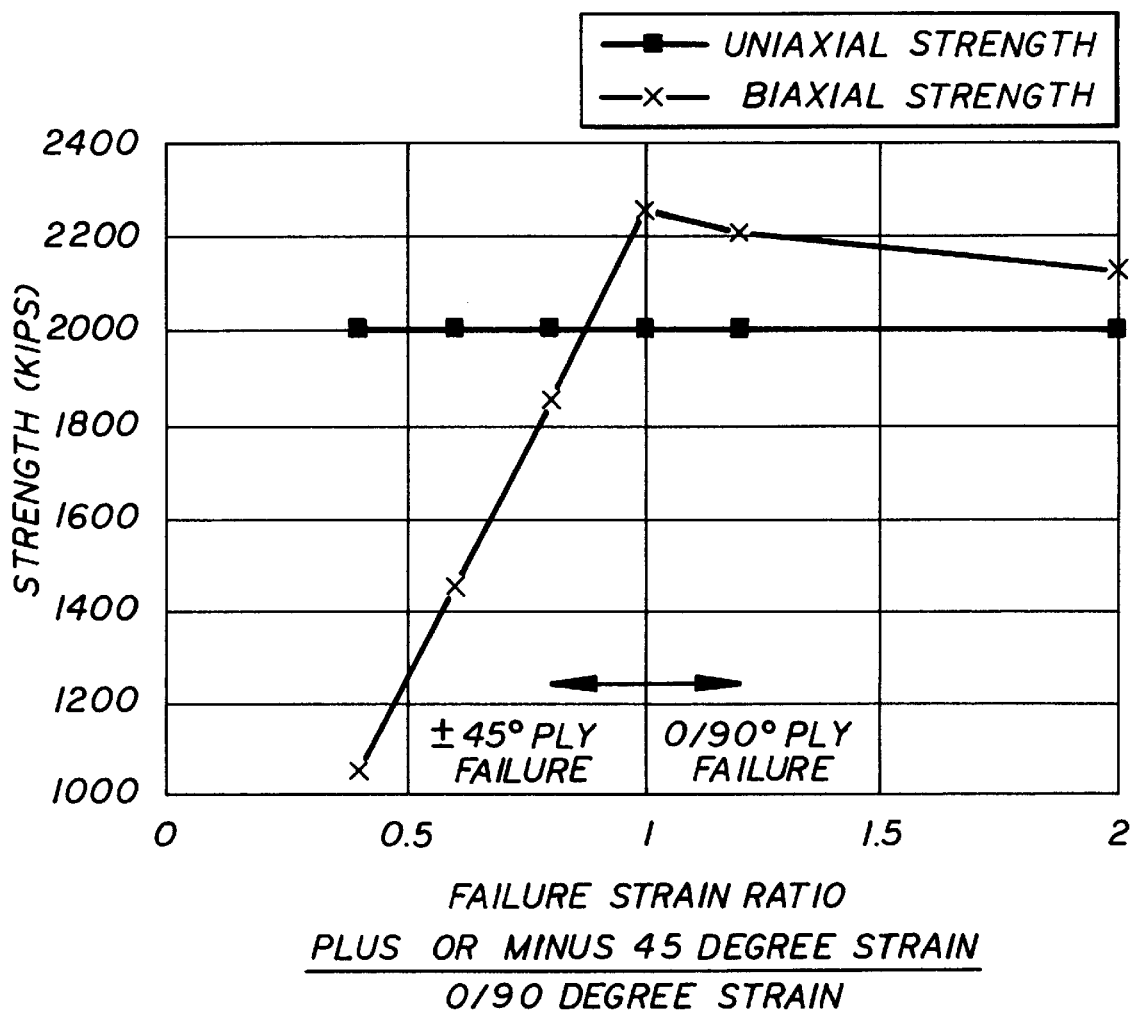

FLEXIBLE MATERIAL FOR USE IN AN INFLATABLE STRUCTURE

This application is a continuation of application Ser. No. 08/545,051, filed Oct. 12, 1995, now abandoned, which is a CIP of Ser. No. 08/315,531, filed Sep. 30, 1994, abandoned.

BACKGROUND OF THE INVENTION

1. Field of the Invention

The invention is directed to the field of flexible materials and, in particular, to the field of flexible composite materials. The material has direct application to inflatable structures such as the gas bag for lighter-than-air vehicles.

2. Description of Related Art

In large non-rigid lighter-than-air vehicles, the material used for the gas bag must meet a large number design requirements such as high strength, provide tear resistance, act as a gas barrier, not be subject to degradation by the environment including ultra violet radiation due to exposure to sunlight. Thus such a material winds up being a multi-layer laminate combining materials with diverse properties. The primary axial loads on any portion of the wall of the gas bag are at 0 degrees to the longitudinal axis of the gas bag and at 90 degrees thereto (circumferential). Thus most laminates include woven filamentary material with the filamentary material orientated at the 0 and 90 degree angles. Additionally, to carry shear loads, filamentary material is sometimes included with orientations at plus or minus 45 degrees to those carrying the axial loads.

In early designs, where stress levels were low, several layers of woven cotton cloth impregnated with rubber to provide the gas seal were often used. Later, artificial fibers such as RAYON™ or DACRON™ were used, manufactured by the E. I. duPont de Nemours & Company (hereinafter referred to as "DuPont"). The layers of cotton cloth were at 0 and 90 degrees (axial or strength plies) for the tension loads and plus and minus 45 degrees (bias plies) for the shear loads. However, this approach did not always result in an optimal strength design for the strength required to carry the shear loading was typically, much less than the capability of the bias plies. Using the same material for both the axial tension loads as well as the bias (shear) loads often resulted in a weight penalty.

Some modem designs use a woven polyester fiber such as DACRON™ for the 0 and 90 degrees axial load carrying material. A film of material that is impervious to Helium such as a polyester terephthalate that serves as the gas barrier is also carries some shear load. A typical polyester terephthalate is sold by DuPont under the trade name MYLAR™. Woven polyester fiber such as DACRON™ has a very large strain to failure value, about 20 percent. However, in large non-rigid airships, the strength requirements have dictated the use of very high strength materials such as a liquid crystal thermotropic (melt spun) polyester polyarylate fiber, for example VECTRAN™ manufactured by Hoechat Celanese, Germany to carry the axial loads. Another high strength material is a lyotropic (solvent spun) aromatic polyaramide fiber, such as KEVLAR™, which is manufactured by DuPont. However, both VECTRAN™ and KEVLAR™ have a very small value of strain to failure value, on the order of 4 percent. If the bias layers where made of the same material, biaxial loading in the 0 and 90 degree fibers will transfer significant load to the 45 degree bias layers. Requiring these layers to work as hard as the 0 and 90° plies, introduces a potential failure mode, or a weakening of the system. In fact having a bias layer with higher elongation than the 0 and 90 degree (strength fibers) precludes premature failure in the bias ply at ultimate load in the strength fibers.

Some of the prior art teaches away from the use of such a concept, for example, German Patent No. DE 3702936 "Fiber Composite Material-With high Tensile And High Modulus Fiber In different Orientations by S. Roth, et al. Roth, et al. teaches the use of fibers with high strength and elongation at 0 and 90 degrees in conjunction with 45 degree fibers that have a high elastic modulus for use in rigid composite structures. Thus the stain value at failure of the plus or minus 45 degree fibers is less than the 0 and 90 fibers.

In U.S. Pat. No. 4,770,918 "Diagram For Producing Sound" by A. Hayashi a flexible diagram for producing sound is disclosed having at least one layer of a first woven fabric having a low elongation and at least two layers of a second woven fabric having a high elongation. The first and second fabrics are disposed in such a fashion that the warps thereof cross each other at between 10 and 80 degrees whereby an elongation of the diaphragm in the direction of the warps of the first fabric is generally equal to the elongation of the diaphragm in a direction inclined at a 45 degree angle relative to the direction of the warps of the first fabric. This allows for ease of tuning of the diaphragm. This invention, of course, would produce an inefficient pressurized structure.

Other patents of general interest wherein materials of different properties are combined into a single flexible structure are U. S. Pat. Nos. 5,189,280 "Three Dimensional Fiber Structures Having Improved Penetration Resistance" by G. A. Harpell, et al., 4,871,598 "Container With Flexible Walls" by E. Potente, et al. and 5,215,795 "Shock-Absorbing Air Bag" by M. Matsumoto, et al.

Thus it is primary object of the invention to provide a laminate material suitable for the wall of flexible pressurized containers.

It is a another primary object of the invention to provide a laminate material suitable for the wall of a flexible pressurized containers wherein bias shear load carrying plies have a greater strain to failure value than the axial tension load carrying plies.

It is a further object of the invention to provide a laminate material suitable for the flexible wall pressurized containers that is not degraded by ultra violet radiation.

It is a still further object of the invention to provide a laminate material suitable for the wall of flexible pressurized containers that are suitable for containing Helium gas.

It is another object of the invention to provide a laminate material suitable for the wall of flexible pressurized containers that can easily be seamed together.

SUMMARY OF THE INVENTION

The invention is a material suitable for use as the wall of a pressurized container such as the gas bag of a lighter-than-air vehicle. In detail, the invention includes a first flexible layer comprising unidirectional filamentary material at 0 and 90 degrees to each other. The filamentary material of the first layer can be separate unidirectional plies at 0 and 90 degrees or woven or weaved cloth. A second flexible layer is included having unidirectional filamentary material at 0 and 90 degrees to each other and at 45 degrees to the filamentary material of the first layer. The filamentary material of the second layer can also consist of separate unidirectional plies at 0 and 90 degrees or woven or weaved cloth. In addition, the filamentary material in both layers can be in the form of single strands or yarns. Also, either or both layers can be divided into a number of thinner layers and mixed together in any fashion. A suitable material for the second layer is a polyester such as DACRON™.

Critical to the invention is that the strain value at failure for the filamentary material of the second layer must be greater than the 0 and 90 degree filamentary material of the first layer. The first and second layers are bonded together by a resin. The first and second plies can also be knitted or stitched together with or without the resin to add additional strength. Preferably, an additional film of a gas impermeable material and an ultra violet radiation resistant material are bonded to the first two layers.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of examples. It is to be expressly understood, however, that the drawings are for purposes of illustration and description only and are not intended as a definition of the limits of the invention.

BRIEF DESCRIPTION OF THE DRAWINGS

FIG. 7 is a graph potting the strength of the 0 and 90 degree fiber as a function of the ratio of the strain rate at failure of the 0 and 90 degree fiber to the plus or minus 45 degree fiber.

DESCRIPTION OF THE PREFERRED EMBODIMENT

Figure 1:
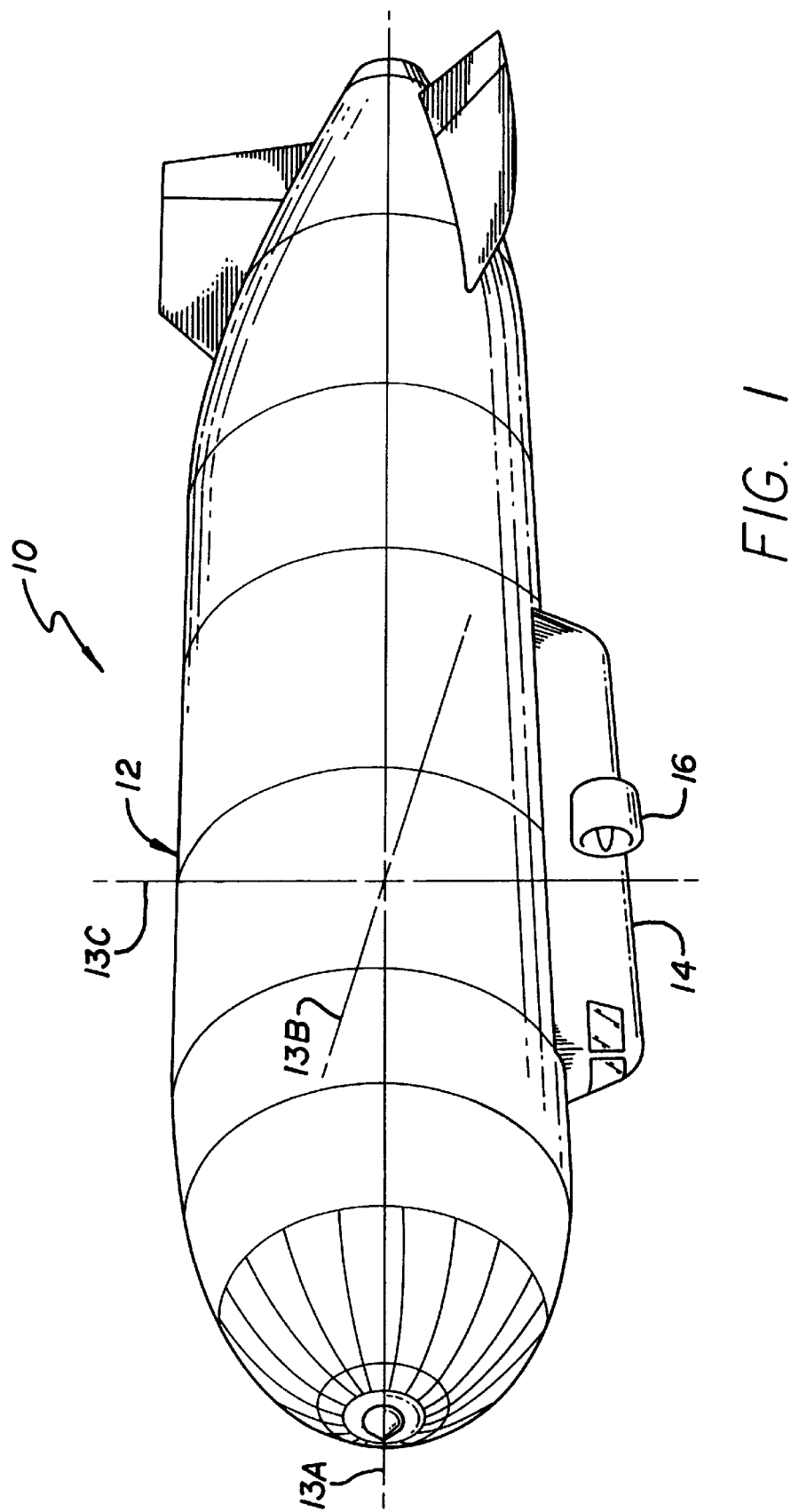
FIG. 1 is a perspective view of a lighter-than-air vehicle.

Illustrated in FIG. 1 is a perspective view of a lighter-than-air vehicle, generally designated by numeral 10. The vehicle 10 includes a gas bag 12 having a longitudinal axis 13A, lateral axis 13B and a vertical axis 13C. A gondola 14 is suspended from the gas bag and which incorporates a plurality of propulsion systems 16 mounted thereon. As the vehicle increases in size, large stress levels are introduced into the gas bag 12. Additionally, the gas bag 12 must be: impervious to Helium gas; not be effected by the environment (including ultra-violet radiation); capable of being seamed; and be damage tolerant. Meeting all these requirements requires a laminated multi-layer flexible cloth made of a different materials having specific mechanical properties.

Figure 2:
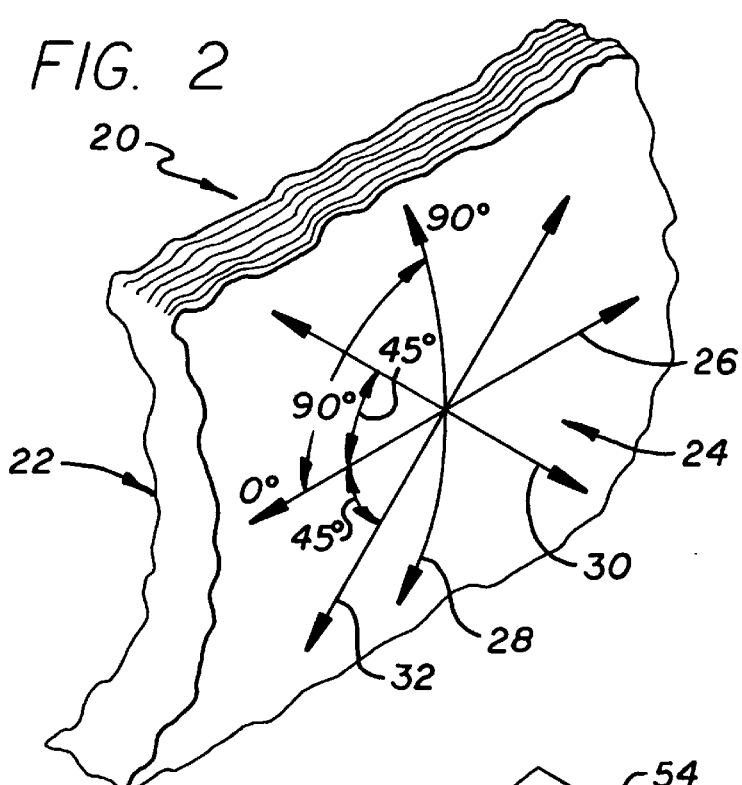
FIG. 2 is a perspective view of a portion of the wall of the gas bag made of flexible fabric laminate illustrating the main axis of filamentary material alignment.

In FIG. 2, a portion of the flexible wall 20 is illustrated having an inside surface 22 and outside surface 24 and is composed of multiple layers of filamentary material in a manner to be subsequently discussed. The main axial loads are introduced along the 0 degree axis, aligned with the longitudinal axis 13A, and indicated by numeral 26, and 90 degrees thereto indicated by numeral 28. Thus the main load carrying filamentary material is aligned with these axis. Shear loads are carried by filamentary material aligned with the plus and minus 45 degree directions indicated by numerals 30 and 32. The angle of 45 degrees can be adjusted based upon the detail requirements of the specific application.

Figure 3:
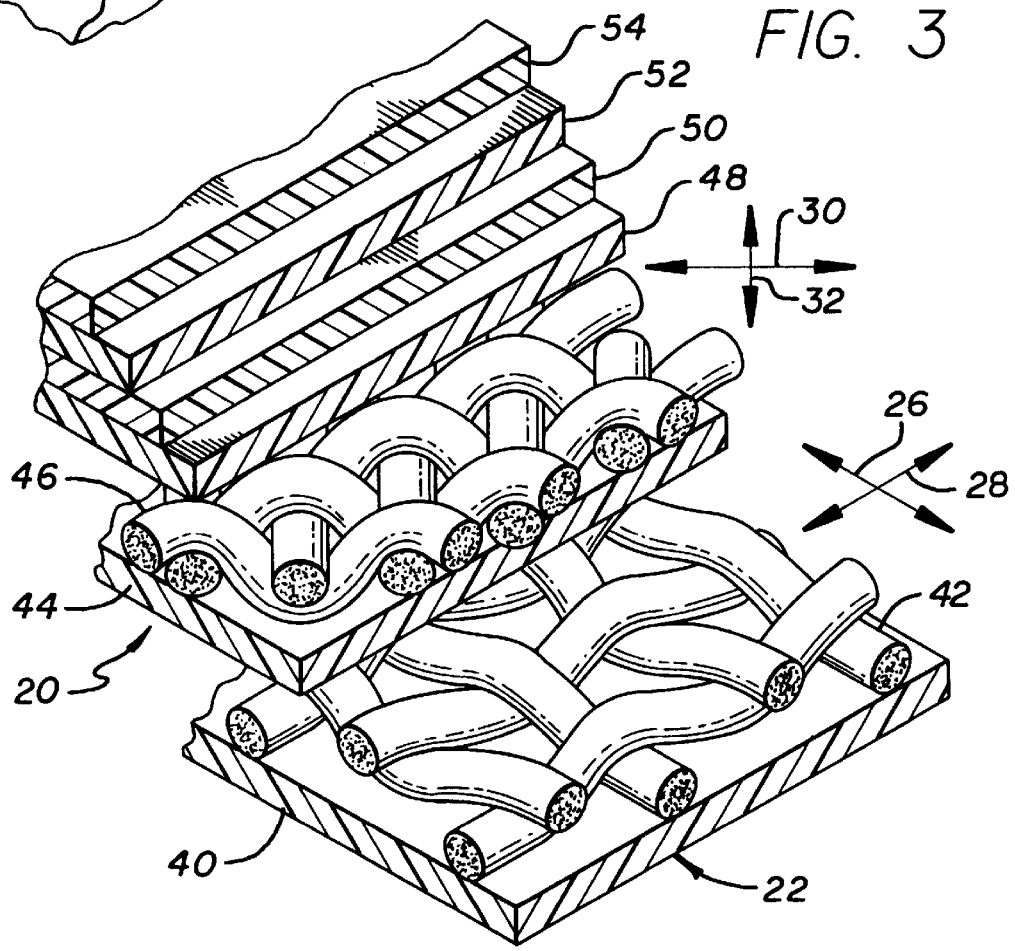
FIG. 3 is a partial perspective view of a portion of the fabric laminate wherein the first and second layers are woven materials.

Referring to FIG. 3 the flexible wall 20 is made of (starting from interior surface 22) a first layer of resin 40 that is bonded to a first layer 42 of woven yarn with individual strands at 0 and 90 degrees. The resin layer 40 and subsequent layers of resin are, preferably, a polyurethane. The first layer 42 is made of a high strength yarn such as liquid crystal thermotropic (melt spun) polyester polyarylate fiber (VECTRAN™). A lyotropic (solvent spun) aromatic polyaramide fiber (KEVLAR™) is also suitable. A second layer of resin 44, separates the first layer 42 from a second layer 46 of woven filamentary material with individual strands at plus or minus 45 degrees. The preferred second layer is a polyester such as DACRON™. Thus first and second layers 42 and 46 are overlaid and completly joined. A third layer of resin 48 separates the second layer 46 from a film of material 50 that is substantially imperious to Helium gas such as polyester terephthalate (MYLAR™). Finally a fourth layer of resin 52 is used to bond an outer layer 54 of a material that is resistant to degradation by ultra violet radiation and also provides protection from wind erosion and the like. Such a material is a polyvinyl fluoride fiber, which is sold under the trade name TEDLAR™ by DuPont. As illustrated in FIG. 3, the material is illustrated in its "lay up form". An alternative to MYLAR™ or TEDLAR™ is to increase the resin content of the laminate so as to impregnate the fibers creating a gas impermeable layer.

The critical factor in the selection of materials for the gas bag wall 20, besides being chemically compatible, is that the strain (inch per inch) at failure of the second layer of filamentary material be greater than the strain at failure for the first layer. This will insure that the strains introduced by the 0 and 90 degrees axial loads into layer 42 do not create failures when transferred into the layer 46. Furthermore, having a high strain rate material for the second layer 46 is very desirable in that it reduces the possibility of local stress concentrations.

Figure 4:
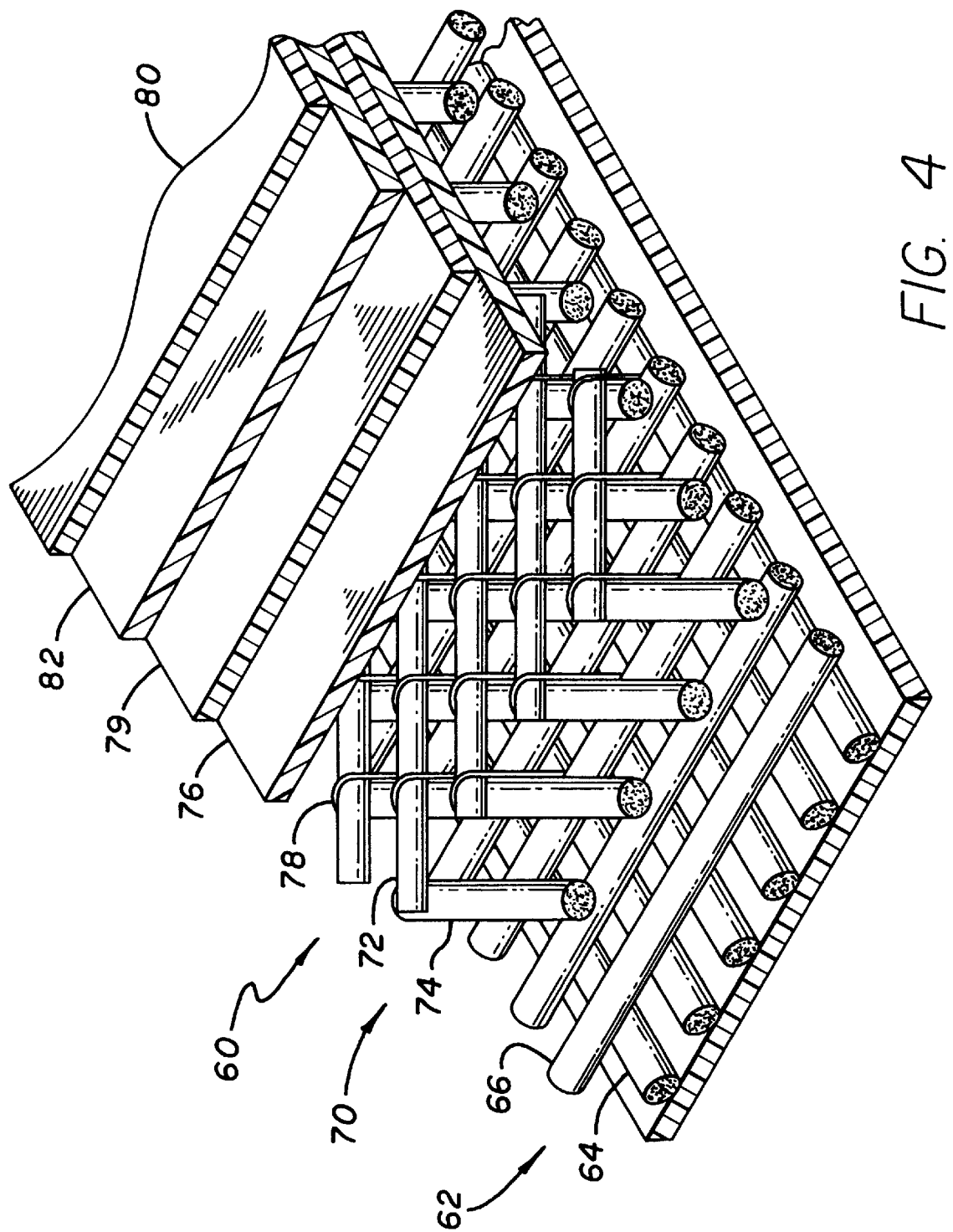
FIG. 4 is a partial side view of a second embodiment of the fabric laminate wherein the filamentary material making up both the first and second layers are unidirectional plies that are stitched together.

In FIG. 4 a second embodiment of the subject material is illustrated and indicated generally by numeral 60. Starting from the bottom up, the material comprises a first layer of resin 61; a first layer 62 having a unidirectional filamentary material ply 64 at 0 degrees and a ply 66 at 90 degrees; a second layer 70 having a unidirectional filamentary material ply 72 at plus 45 degrees and a second ply 74 at minus 45 degrees. The four plies 62, 64, 72 and 74 are stitched together, with the stitches indicated by numeral 78. Thus first and second layers 61 and 70 are overlaid and completly joined. A Helium gas barrier layer of material such as MYLAR™ layer 79 is bonded there over by the resin layer 76 and a final layer 80 a ultra violet radiation resistant material such as of TEDLAR™ is bonded by means of a resin layer 82. As in the first embodiment illustrated in FIG. 3, when the individual layers are bonded together, the first and second layers, 62 and 70, respectively, become encapsulated in a flexible resin matrix. It should be noted that the woven or weaved first and second layers of material 42 and 46, respectively illustrated in FIG. 3 could also be stitched together.

Figure 5:
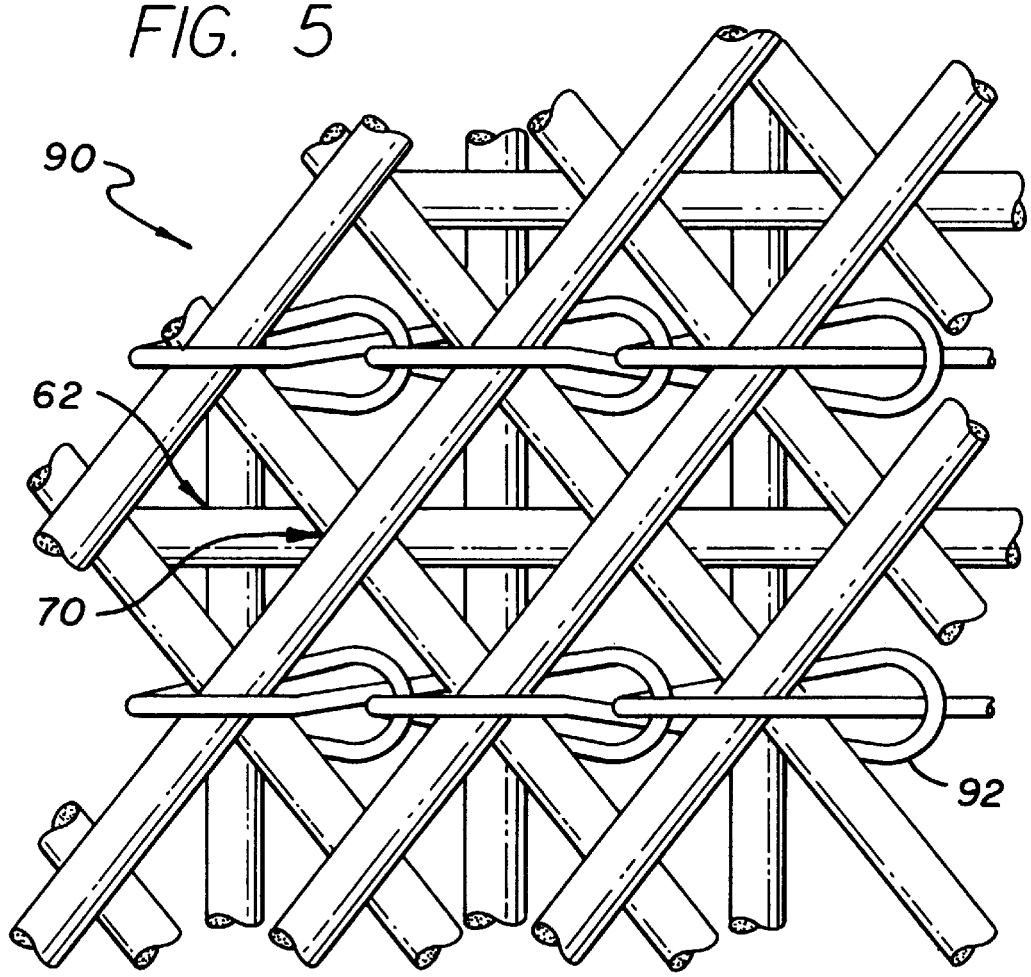
FIG. 5 view of a third embodiment of the fabric laminate perpendicular thereto wherein the filamentary material making up both the first and second layers are unidirectional plies that are knitted together.
Figure 6:
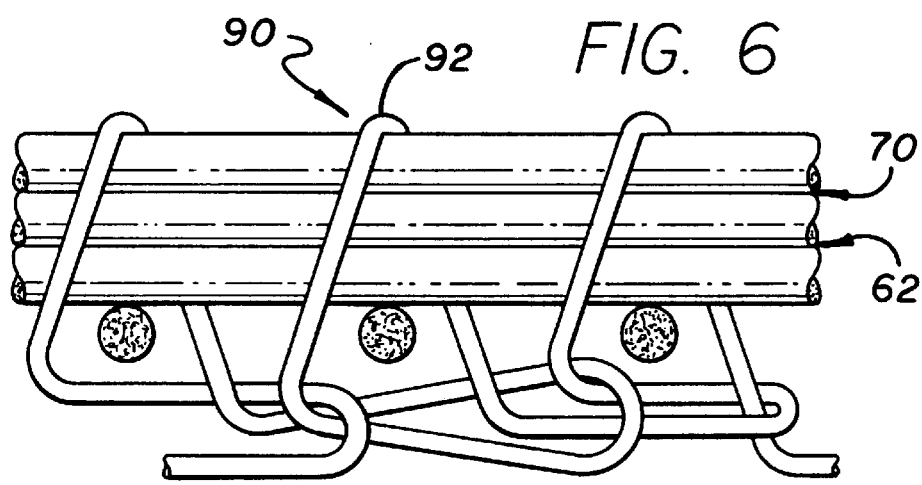
FIG. 6 is a side view of the third embodiment of the fabric laminate illustrated in FIG. 5.

In FIGS. 5 and 6 a third embodiment is illustrated, generally indicated numeral 90 wherein the first and second layers 62 and 70 shown in FIG. 4 are knitted together as indicated by numeral 92. The remainder of the material 90 would be similar to FIG. 4. Again, it should be noted that the woven or weaved first and second layers of material 42 and 46, respectively illustrated in FIG. 3 could also be knitted together to improve strength.

As previously mentioned it is critical to the invention that the strain value at failure for the filamentary material in the second plus or minus 45 layer must be greater than the 0 and 90 degree filamentary material for the first layer. FIG. 7 demonstrates the importance of this feature. The strength of the material under both uniaxial and biaxial loading conditions is shown with a series of different strain values for the biaxial material. The biaxial material strain to failure is divided by the 0 and 90 degree material strain to failure to produce a strain ratio. If the ratio is less than one the plus or minus 45 degree bias layer will fail first, a ratio greater than one means the 0 and 90 degree layer will fail first. The severe penalty for low ratio's is obvious.

While the invention has been described with reference to a particular embodiments, it should be understood that the embodiments are merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to the composites industry and also to the aircraft industry.

What is claimed:

1. A flexible laminated high strength, tear resistant, gas impermeable, ultra-violet radiation and wind resistant material for lighter-than-air vehicles and the like, comprising:
   a) a flexible wall having interior and exterior exposed surfaces and including multiple bonded layers intermediate of said interior and exterior exposed surfaces;
   b) said interior exposed surface having a first layer of bonding resin;
   c) at least one first layer of high strength woven material having individual strands at 0° and 90° bonded to said first layer of bonding resin;
   d) at least one second layer of high strength woven material having individual strands at plus and minus 45°;
   e) securing means for bonding said at least one first and said at least one second layers together;
   f) said at least one second layer having a strain-at failure value greater than said at least one first layer;
   g) a second layer of bonding resin;
   h) a layer of gas impermeable plastic resin material;
   i) said second layer of bonding resin bonding said layer of gas impermeable plastic resin material to said at least one second layer of high strength woven material;
   j) a layer of ultra-violet radiation and wind resistant material;
   k) a third layer of said bonding resin;
   l) said third layer of said bonding resin bonding said layer of ultra-violet radiation and wind resistant material to said impermeable plastic resin material;
   m) said exterior exposed surface being a fourth layer of bonding resin;
   n) said fourth layer of said bonding resin having bonded to said ultra-violet radiation and wind resistant material.

2. A flexible laminated material as in claim 1, and wherein:
   a) said first, second, third, and fourth layers of bonding resin are polyurethane resin.

3. A flexible laminated material as in claim 1, and wherein:
   a) said securing means for bonding said at least one first and said at least one second layers of high strength woven material is a polyurethane resin.

4. A flexible laminated material as in claim 1, and wherein:
   a) said securing means for bonding said at least one first said at least one second layers of high strength woven material is stitching.

5. A flexible laminated material as in claim 1, and wherein:
   a) said securing means for bonding said at least one first and said at least one second layers of high strength woven material is knitting.

6. A flexible laminated material as in claim 1, and wherein:
   a) said at least one first layer of high strength woven material is fiber taken from the group consisting of melt spun and solvent spun fibers.

7. A flexible laminated material as in claim 1, and wherein:
   a) said gas impermeable plastic resin material is a polyester terephthlate.

8. A flexible laminated material as in claim 1, and wherein:
   a) said ultra-violet radiation and wind resistant material layer is a polyvinyl fluoride.

9. A flexible laminated material as in claim 1, and wherein:
   a) said melt spun solvent spun fibers are polyarylate and polyamide fibers respectively.

10. A flexible laminated material as in claim 1, and wherein:
    a) said bonding resin layer is a polyester resin.

* * * * *